United States Patent [19]
Van Swam

[11] Patent Number: 6,005,906
[45] Date of Patent: Dec. 21, 1999

[54] CORROSION AND HYDRIDE RESISTANT NUCLEAR FUEL ROD

[75] Inventor: Leonard F. P. Van Swam, Richland, Wash.

[73] Assignee: Siemens Power Corporation, Richland, Wash.

[21] Appl. No.: 08/660,979

[22] Filed: Jun. 12, 1996

[51] Int. Cl.[6] .................................................. G21C 3/06
[52] U.S. Cl. ........................ 376/417; 376/409; 376/414; 376/416; 376/457
[58] Field of Search .................................. 376/409, 414, 376/416, 417, 457

[56] References Cited

U.S. PATENT DOCUMENTS

| | | | |
|---|---|---|---|
| 3,969,186 | 7/1976 | Thompson et al. | 176/68 |
| 4,045,288 | 8/1977 | Armijo | 376/417 |
| 4,659,545 | 4/1987 | Ferrari | 376/457 |
| 4,675,153 | 6/1987 | Boyle et al. | 376/416 |
| 4,751,044 | 6/1988 | Hwang et al. | 376/416 |
| 4,894,203 | 1/1990 | Adamson | 376/416 |
| 5,023,048 | 6/1991 | Mardon et al. | 376/416 |
| 5,278,882 | 1/1994 | Garde et al. | 376/417 |
| 5,341,407 | 8/1994 | Rosenbaum et al. | 376/409 |
| 5,373,541 | 12/1994 | Mardon et al. | 376/457 |
| 5,434,897 | 7/1995 | Davies | 376/416 |
| 5,436,947 | 7/1995 | Taylor | 376/416 |
| 5,436,948 | 7/1995 | Okada et al. | 376/419 |
| 5,475,723 | 12/1995 | Marlowe | 376/416 |

OTHER PUBLICATIONS

One page Abstract of Japan, vol. 006, No. 231 17 Nov. 1982 No. 57 134552 A (Tokyo Shibura Denki KK–abstract).

Four–page Communication (European Search Report) dated Oct. 1, 1997.

Journal of Nuclear Materials, vol. 46, 1973, "Strain–Ageing In Zirconium–Oxygen Alloys", Kelly, et al., pp.23–34.

Kuwae et al., Zirconium Radical Alloy Based Substance, Translation of Japanese Patent JP 57–134552, JPO Patent Journal, pp. 1–14 Aug. 1982.

*Primary Examiner*—Charles T. Jordan
*Assistant Examiner*—Jack Keith
*Attorney, Agent, or Firm*—Ira Lee Zebrak

[57] ABSTRACT

A corrosion and hydride resistant nuclear fuel rod having a highly corrosion resistant outer portion in which hydride precipitation is inhibited and an inner portion in which hydride precipitation is promoted.

24 Claims, 6 Drawing Sheets

CORROSION AND HYDRIDE RESISTANT NUCLEAR FUEL ROD

FIELD OF THE INVENTION

The present invention relates generally to nuclear fuel for nuclear power reactors, and more particularly to an improved nuclear fuel rod having a metallic tubular cladding which will reduce the formation of hydrides on the portion of the cladding exposed to the reactor coolant and subject to oxidation and corrosion.

BACKGROUND OF THE INVENTION

During operation in a nuclear reactor in which the coolant and/or moderator is water, corrosion occurs on the outside of the cladding tubes of nuclear fuel rods assembled in nuclear fuel assemblies which limits the length of time that the fuel rods and fuel assembly are usable in the nuclear reactor. A nuclear fuel rod typically has a cladding tube which houses a stack of fuel pellets of sintered uranium oxide, plutonium oxide or a mixture of such oxide fuels, and end plugs which seal both the upper and lower ends of the cladding tube. The cladding tube functions, in part, to prevent contact and thereby prevent chemical reaction between the fuel pellets and the coolant moderator as well as to prevent contamination of the coolant moderator by radioactive fission products emitted from the fuel pellets. The loss of leak tightness of the cladding tube could contaminate the reactor and associated systems and interfere with plant operations.

The cladding tube is required to have excellent mechanical properties and high corrosion resistance in the environment and for the conditions expected during reactor operations. Common cladding materials include zirconium, zirconium alloys, and stainless steel. Zirconium alloys in which the major component is zirconium are widely used for the cladding tube. Two of the most commonly used zirconium alloys are Zircaloy 2 and Zircaloy 4 and are described in American Society for Testing and Materials standard B350-93 (1993), Standard Specification For zirconium and zirconium Alloy Ingots For Nuclear Application, compositions R60802 and R60804, respectively. Zircaloy 2 (composition R60802) is composed of from 1.20 to 1.70 weight percent tin, 0.07 to 0.20 weight percent iron, 0.05 to 0.15 weight percent chromium, 0.03 to 0.08 weight percent nickel, where the iron plus chromium plus nickel content is from 0.18 to 0.38 weight percent, and the balance is zirconium plus impurities. Zircaloy 4 (composition R60804) is composed of from 1.20 to 1.70 weight percent tin, 0.18 to 0.24 weight percent iron, 0.07 to 0.13 weight percent chromium, where the iron plus chromium content is 0.28 to 0.37 weight percent, and the balance is zirconium plus impurities. The maximum impurities for Zircaloy 2 and Zircaloy 4 are given in the following table which is from Table 1 of the ASTM B350-93 Standard.

TABLE I

MAXIMUM IMPURITIES, WEIGHT %

| | R 60802 | R 60804 |
|---|---|---|
| Aluminum | 0.0075 | 0.0075 |
| Boron | 0.00005 | 0.00005 |
| Cadmium | 0.00005 | 0.00005 |
| Carbon | 0.027 | 0.027 |
| Cobalt | 0.0020 | 0.0020 |
| Copper | 0.0050 | 0.0050 |
| Hafnium | 0.010 | 0.010 |
| Hydrogen | 0.0025 | 0.0025 |
| Oxygen | * | * |
| Magnesium | 0.0020 | 0.0020 |
| Manganese | 0.0050 | 0.0050 |
| Molybdenum | 0.0050 | 0.0050 |
| Nickel | — | 0.0070 |
| Niobium | 0.010 | 0.010 |
| Nitrogen | 0.0065 | 0.0065 |
| Silicon | 0.012 | 0.0120 |
| Tin | — | — |
| Titanium | 0.0050 | 0.0050 |
| Tungsten | 0.010 | 0.010 |
| Uranium (Total) | 0.00035 | 0.00035 |

*When so specified in a purchase order, oxygen shall be determined and reported. Maximum or minimum permissible values, or both, shall be as specified.

Although several zirconium alloys such as Zircaloy 2 and Zircaloy 4 have excellent properties for use as a cladding material, they are subject to corrosion, and at high degrees of burn up or after long in-reactor residence time, the cladding tube of fuel rods for light water reactors made of such alloys may reach a state of accelerated corrosion. Accelerated corrosion leads to very rapid increases in oxide thickness, frequently well beyond the currently accepted limit of approximately 80 to 100 microns, and equally if not more importantly results in high hydrogen absorption by the cladding material which may lead to unacceptable loss of cladding ductility due to hydride formation.

During corrosion of the cladding, the reactor coolant water reacts at a slow rate with the zirconium metal to form an oxide layer upon the surface of the cladding. In this reaction, hydrogen is being formed and can enter the zirconium metal, as a result of a zirconium water reaction $Zr+2H_2O \rightarrow ZrO_2+4H$, or more particularly, $$Zr+2H_2O \rightarrow ZrO_2+2[(p)2H(abs)+(1-p)H_2 \text{ (gas)}] \quad (1)$$

where H(abs) is the portion of the corrosion generated hydrogen that is absorbed by the zirconium metal, $H_2$(gas) is the portion of the corrosion generated hydrogen which is released into the reactor coolant water, and p is the pick up fraction or the fraction of hydrogen generated in the corrosion reaction that is absorbed by the zirconium metal. A portion of the hydrogen thus produced diffuses into the zirconium metal, and the rest is released into the reactor coolant water. At the temperature of the cladding during reactor operation, the hydrogen absorbed by the cladding initially is in solid solution in and diffuses within the zirconium metal, but after the hydrogen concentration reaches the solid solubility limit for hydrogen in the zirconium metal, the hydrogen precipitates within the zirconium metal as a distinct separate phase in the form of zirconium hydride, a compound of zirconium and hydrogen.

At high degrees of burn up or after long in-reactor residence time, and the accumulation of a large number of hydride precipitates in the zirconium metal, accelerated corrosion of the cladding occurs and the corrosion reaction changes from Equation 1 to:

$$Zr+4H_2O+ZrH_2 \rightarrow 2ZrO_2+5[(p)2H(abs)+(1-p)H_2(gas)] \quad (2)$$

where the corrosion rate increases very rapidly and the reactor coolant water reacts with both the zirconium metal and with the zirconium hydride to form zirconium oxide and hydrogen.

The zirconium hydride precipitates are not however evenly distributed throughout the zirconium metal cladding since the solid solubility limit of hydrogen in zirconium metal is directly proportional to the cladding temperature which varies across the thickness of the cladding wall. In regions of the cladding having a lower temperature, less hydrogen stays in solid solution in the zirconium and more hydrogen precipitates to form hydrides whereas in regions of the cladding having higher temperature, more hydrogen stays in solid solution within the zirconium and less hydrogen precipitates to form zirconium hydride. Thus, on the outside surface of the cladding (which is in contact with the reactor coolant water) and in those inner portions of the cladding which are closer to the outside of the cladding and away from the nuclear fuel pellet, a greater amount of hydrogen precipitates to form zirconium hydride, whereas less zirconium hydride precipitates are formed near the inner portion of the cladding closer to the fuel pellet. Fuel cladding designs which utilize a single zirconium alloy in a single layer cladding tube are thus subject to a predisposition for hydride accumulation on the outer lower temperature portions of the fuel rod cladding. In fuel cladding designs which are a composite of two or more layers of zirconium and/or zirconium alloys which are typically bonded together to form the cladding tube, the outer layer of zirconium or zirconium alloy, which is at a lower temperature during reactor operations, is also subject to the above-described predisposition to hydride formation, whereas the inner zirconium or zirconium alloy layer, by virtue of being at a higher temperature during reactor operations, is predisposed to less hydride formation. Accordingly, at least for these reasons, the outer layer of composite cladding of nuclear fuel rods for pressurized water reactors has been designed and material has been selected to be highly corrosion resistant, whereas the inner zirconium alloy layer has been selected to provide desirable mechanical properties to the cladding such as high yield strength and low creep rate.

Similarly, for these same reasons, the outer layer of composite cladding of nuclear fuel rods for boiling water reactors has been designed and material has been selected to be highly corrosion resistant and provide desirable mechanical properties to the cladding whereas the inner zirconium or zirconium alloy layer has been selected to provide enhanced resistance to stress corrosion cracking which may result from pellet-cladding interaction and the release of fission products from the fuel pellets.

It would therefore be an advantage over prior art fuel rod designs to provide a nuclear fuel rod with a cladding which avoids or overcomes the above-mentioned disadvantages and which has improved corrosion resistance and improved resistance to hydride formation, particularly on the outer layer of the cladding tube, and improved resistance to accelerated corrosion, while maintaining the strength of the cladding tube.

SUMMARY OF THE INVENTION

In accordance with one aspect of the present invention, a corrosion resistant nuclear fuel element for a water cooled and or moderated nuclear reactor is disclosed comprising: an elongated hollow metallic tubular cladding for containing a nuclear fuel, the tubular cladding comprising an outer tubular layer having an outer wall and an inner wall and an inner portion disposed between the outer wall and the inner wall, the outer tubular layer formed from metal selected from the group of zirconium and a zirconium alloy having integrally incorporated a predetermined concentration of oxygen, said predetermined concentration of oxygen being a decreasing oxygen concentration gradient from the outer wall extending into the inner portion, so that when subject to corrosion zirconium hydrides preferentially precipitate in the inner portion and are inhibited from forming on the outer wall; a body of nuclear fuel material disposed in the tubular cladding; and sealing means at both ends of the tubular cladding.

In accordance with another aspect of the present invention, a corrosion resistant nuclear fuel element for a water cooled and or moderated nuclear is also disclosed comprising: an elongated hollow metallic tubular cladding for containing a nuclear fuel, the tubular cladding comprising an outer tubular layer having an outer wall and an inner wall and an inner portion disposed between the outer wall and the inner wall, the outer tubular layer formed from a metal selected from the group consisting of zirconium and a zirconium alloy, the outer tubular layer having integrally incorporated a first predetermined concentration of oxygen and an inner tubular layer bonded to the inner wall of the outer tubular layer and formed from a metal selected from the group consisting of zirconium and a zirconium alloy, the inner tubular layer having integrally incorporated a second predetermined concentration of oxygen, said second predetermined concentration of oxygen being less than said first predetermined concentration of oxygen so that when subject to corrosion, zirconium hydrides preferentially precipitate in the inner tubular layer and are inhibited from forming in the outer layer; a body of nuclear fuel material disposed in the tubular cladding; and sealing means at both ends of the tubular cladding for hermetically sealing the metallic tubular cladding.

DETAILED DESCRIPTION OF THE INVENTION

With the foregoing and other objectives in view there is provided, in accordance with the invention, a nuclear fuel rod comprising a cladding tube of a zirconium alloy and having a highly corrosion resistant outer portion in which zirconium hydride precipitation is inhibited and an inner portion in which zirconium hydride precipitation is promoted. In accordance with the present invention, there is also provided a nuclear fuel rod comprising a multiple-layer composite cladding having an inner zirconium or zirconium alloy layer and a highly corrosion resistant zirconium or zirconium alloy outer layer having an outer portion in which hydride precipitation is inhibited and an inner portion of the outer layer in which zirconium hydride precipitation is promoted. In accordance with the present invention, there is further provided a nuclear fuel rod comprising a multi-layered composite cladding having a highly corrosion resistant zirconium or zirconium alloy outer layer in which hydride precipitation is inhibited, and a zirconium or zirconium alloy inner layer where hydride precipitation is promoted.

In a recent research program involving corrosion studies of a composite two-layer cladding for a nuclear fuel rod for a light water reactor having an outer layer of Zircaloy 4 and a zirconium inner layer, it was observed by the present inventor that zirconium hydrides precipitated in the lower oxygen content zirconium inner layer and not in the outer higher oxygen content Zircaloy 4 layer whereas the temperature gradient across the wall of the composite cladding was such that hydride precipitation would have been expected in the Zircaloy 4 outer layer. The present inventor discovered that the amount of hydride precipitation is in part a function of the amount of oxygen in the zirconium alloy and zirconium metal and by limiting the oxygen content to a low level in an inner portion or layer of a zirconium metal and/or zirconium alloy fuel rod cladding and increasing the oxygen content to a higher level in an outer portion or layer of the cladding, enhanced resistance to hydride formation and corrosion is obtained in the outer portion or layer compared to conventional single layer or multiple layered claddings made of zirconium and/or zirconium alloys with a non-varying or uniform oxygen content across the cladding wall. During continued corrosion of the cladding when exposed in a nuclear reactor, the absence of hydride formation near the cladding outside surface limits the corrosion reaction to that described by Equation (1), whereas if hydrides precipitate in large quantities near the outside surface of the cladding, the corrosion reaction is more appropriately described by Equation (2) which, as explained above, leads to an acceleration in the corrosion rate. In accordance with the present invention, by inhibiting the formation of hydride precipitates in the outer portion or layer of the cladding, accelerated corrosion is inhibited.

In accordance with the present invention, a nuclear fuel rod for water moderated or cooled reactors is provided having a metallic tubular cladding comprising a zirconium alloy and having a decreasing oxygen concentration gradient from the outer wall to the inner wall where despite being subject to an increasing temperature gradient from the outer wall to the inner wall of the cladding during reactor operations, zirconium hydrides preferentially precipitate in the inner portions of the cladding away from the cladding outside wall and are inhibited from forming on the outer wall. In a preferred embodiment, the oxygen content in the cladding tube decreases from an amount greater than approximately 1600 ppm at the outer wall of the cladding to less than approximately 1200 ppm at the inner wall of the cladding.

In an alternative embodiment, a nuclear fuel rod for water moderated or cooled reactors is provided having a cladding tube comprising a composite of two or more layers of zirconium and/or zirconium alloy metals, the outermost layer having a higher oxygen content than an inner layer of the cladding where despite being subject to an increasing temperature gradient across the cladding wall during reactor operations, zirconium hydrides will preferentially precipitate in the inner layer of the cladding and will be preferentially inhibited from precipitating in the outermost layer of the cladding. In a preferred embodiment, the oxygen content of the outermost layer is greater than about 1600 ppm and the oxygen content of the inner layer is less than about 1200 ppm.

In another alternative embodiment, a nuclear fuel rod for water moderated or cooled reactors is provided having a cladding tube comprising a composite of two or more layers, the outermost layer comprising a zirconium or zirconium alloy metal having a decreasing oxygen concentration gradient from the outer wall to the inner portion of the outermost layer, where despite a temperature gradient across the cladding wall, zirconium hydrides will preferentially precipitate in the inner portion of the outermost layer of the cladding and will be preferentially inhibited from precipitating near the outer wall of the outermost layer of the cladding. In a preferred embodiment, the oxygen content in the outermost layer of the composite cladding decreases from an amount greater than about 1600 ppm at the outer wall to less than about 1200 ppm in the inner portion of the outer layer of the composite cladding.

In the outer portion or layer of the cladding comprised of the zirconium metal or alloy having the higher oxygen concentration, the hydrogen which was formed as a result of the reaction between the reactor coolant water and the zirconium and which was picked up in the outer portion or layer, continues to diffuse through the outer portion or layer and into the inner portion or layer of the cladding. The hydrogen does not precipitate to form hydrides in the oxygen-enriched outer portion or layer because the hydrogen concentration does not reach the raised solubility limit and diffuses into the low oxygen inner portion or layer where it preferentially precipitates as a result of the hydrogen concentration exceeding the lowered solubility limit.

Opposing the preferential precipitation of hydrogen in the inner portion or layer low oxygen alloy is the temperature gradient across the wall of the cladding tube. Since the portions of the cladding closer to the fuel pellet are at a higher temperature than the portions of the cladding closer to or in contact with the reactor coolant water, the inner portion or layer low oxygen concentration alloy is at a higher temperature which raises the solubility limit of hydrogen in the metal alloy. Thus, the temperature gradient across the wall of the cladding tube affects the solubility limits of the inner layer and the outer layer and tends to encourage the precipitation of hydrogen as hydrides in the inner layer low oxygen metal alloy near the interface with the outer layer high oxygen metal alloy. Therefore, even in the presence of a temperature gradient which would promote hydride precipitation in the outermost layer of conventional cladding, such precipitation near the outside surface is prevented when the outer layer of the cladding comprises a high oxygen alloy and the inner portion of the cladding has a lower oxygen content.

Figure 1:
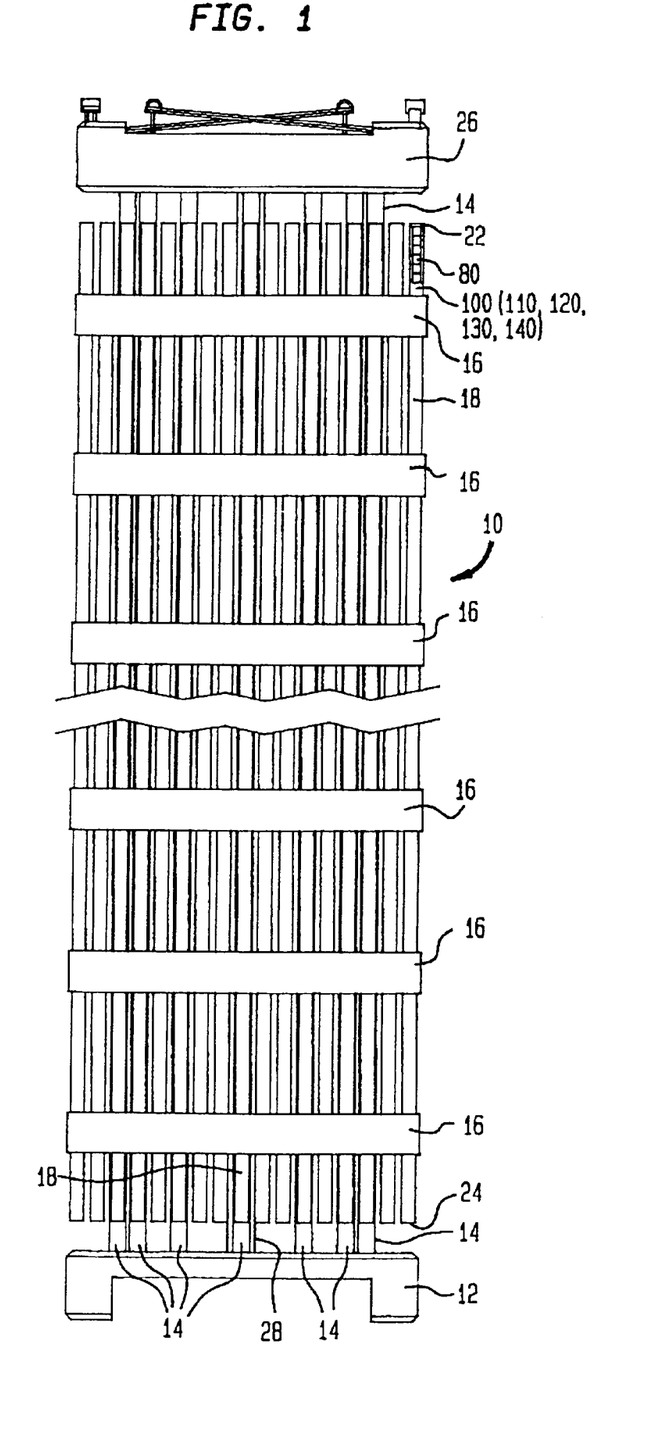
FIG. 1 is a side elevational view of a nuclear fuel assembly for a pressurized water reactor, the assembly being foreshortened in height.
Figure 2:
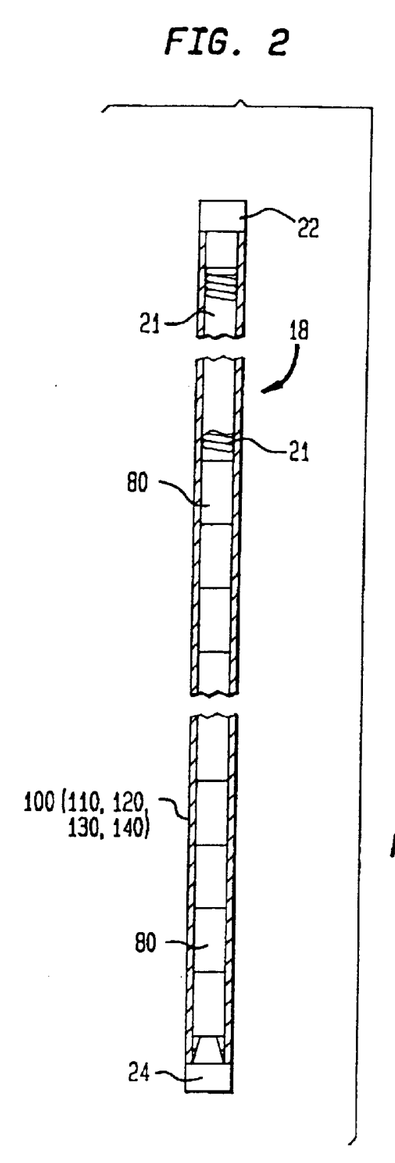
FIG. 2 is a partial longitudinal sectional view of the nuclear fuel rod shown in FIG. 1 with a portion of the cladding being cut away.

FIG. 1 represents a nuclear fuel assembly 10 for a pressurized water reactor (PWR) comprising a lower tie plate 12, guide tubes 14, nuclear fuel rods 18 which are spaced radially and supported by spacer grids 16 spaced along the guide tubes, an instrumentation tube 28, and an upper tie plate 26 attached to the upper ends of the guide tubes. Each fuel rod 18 generally includes a metallic tubular fuel rod cladding 100 within which are nuclear fuel pellets 80 composed of fissionable and/or fertile material and an upper end plug 22 and a lower end plug 24 which hermetically seal the nuclear fuel pellets within the metallic tubular fuel rod cladding as shown in FIG. 2. A helical spring member 21 can be positioned within the fuel rod to maintain the position of the fuel pellets in a stacked relationship. Control rods which are used to assist in controlling the fission reaction are disposed in the guide tubes, but are not shown.

Figure 3:
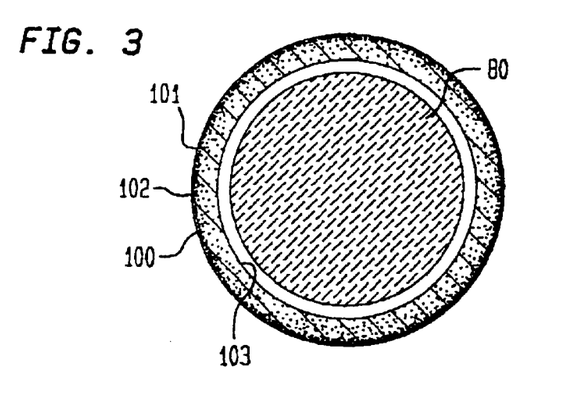
FIG. 3 is a schematic representation of a cross-sectional view of the nuclear fuel rod shown in FIG. 2.

Referring to FIG. 3 which is a schematic representation of cross-sectional view of the nuclear fuel rod shown in FIG. 2, cladding 100 is a metallic tube having a single metal layer 101 of a zirconium alloy with a decreasing oxygen concentration gradient (depicted as a decreasing density in stippling) from outer wall 102 to inner wall 103. During reactor operations, fuel pellets 80 which are positioned within the cladding generate heat which is transferred through the cladding to outer wall 102 to the reactor coolant which results in a decreasing temperature gradient from inner wall 103 to outer wall 102 of the cladding. In a preferred embodiment, the oxygen concentration gradient from outer wall 102 to inner wall 103 decreases from at least about 1600 ppm to less than about 1200 ppm.

Figure 4A:
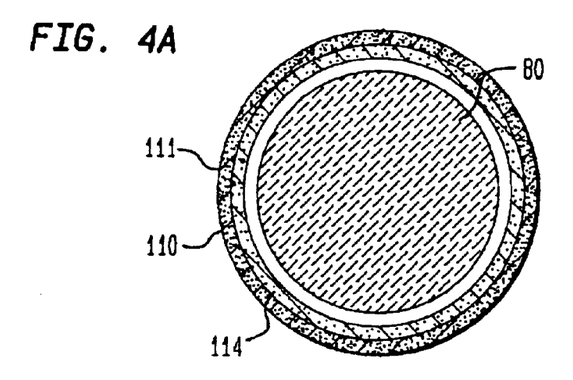
FIG. 4A is a schematic representation of a cross-sectional view of a nuclear fuel rod for use in a PWR and having a composite cladding comprising two layers.

Referring to FIG. 4A which is a schematic representation of a cross-sectional view of a nuclear fuel rod for a PWR such as shown in FIGS. 1 and 2 but instead has a composite cladding 110 comprising an outer layer 111 and an inner layer 114 each of which is composed of a zirconium and/or zirconium alloy metal. Outer layer 111 has a higher oxygen content than inner layer 114 (which is depicted as different stippling) so that hydrides will preferentially precipitate in inner layer 114 and be inhibited from precipitating in outer layer 111. In a preferred embodiment, outer layer 111 has an oxygen content greater than about 1600 ppm, and inner layer 25 has an oxygen content less than about 1200 ppm.

Figure 4B:
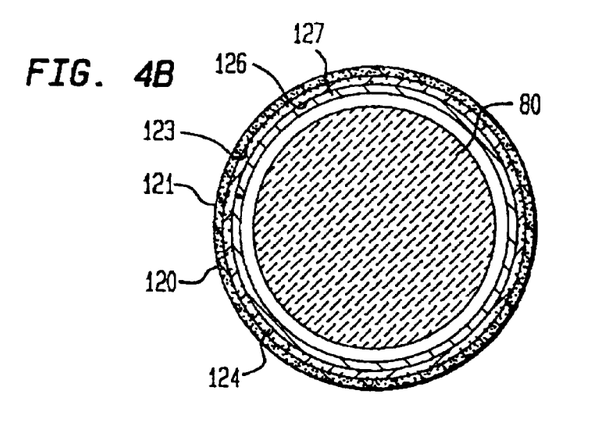
FIG. 4B is a schematic representation of a cross-sectional view of a nuclear fuel rod for use in a PWR and having a composite cladding comprising three layers.

Referring to FIG. 4B which is a schematic representation of a cross-sectional view of another nuclear fuel rod for a PWR such as shown in FIGS. 1 and 2 but instead has a composite cladding 120 comprising an outer layer 121, an inner layer 124 and an innermost layer 127. Outer layer 121 and inner layer 124 are composed of a zirconium and/or zirconium alloy metal. Outer layer 121 has a higher oxygen content than inner layer 124 (which is depicted as different stippling) so that hydrides will preferentially precipitate in inner layer 124 and be inhibited from precipitating in outer layer 121. Innermost layer 127 can be zirconium or a zirconium alloy, or another metal. In a preferred embodiment, outer layer 121 has an oxygen content greater than about 1600 ppm, and inner layer 124 has an oxygen content less than about 1200 ppm.

Figure 4C:
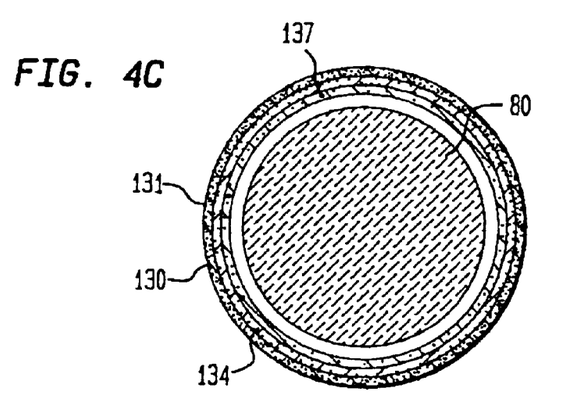
FIG. 4C is a schematic representation of a cross-sectional view of another nuclear fuel rod for use in a PWR and having a composite cladding comprising three layers.

Referring to FIG. 4C which is a schematic representation of a cross-sectional view of another nuclear fuel rod for a PWR such as shown in FIGS. 1 and 2 but instead has a composite cladding 130 comprising an outer layer 131, an inner layer 134 and an innermost layer 137 each of which is composed of a zirconium and/or zirconium alloy metal. Outer layer 131 has a higher oxygen content than inner layer 134 (which is depicted as different stippling) so that hydrides will preferentially precipitate in inner layer 134 and be inhibited from precipitating in outer layer 131. In a preferred embodiment, outer layer 131 has an oxygen content greater than about 1600 ppm, and inner layer 134 as an oxygen content less than about 1200 ppm. In another preferred embodiment, innermost layer 137 has an oxygen concentration which is at least that of inner layer 134 but less than or equal to outer layer 131.

Figure 5:
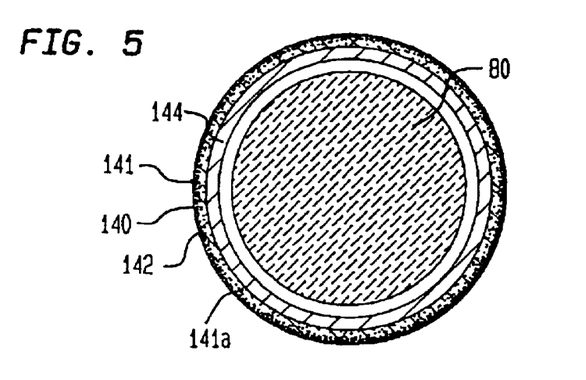
FIG. 5 is a schematic representation of a cross-sectional view of another nuclear fuel rod for use in a PWR and having a composite cladding comprising at least two layers.

Referring to FIG. 5 which is a schematic representation of a cross-sectional view of another nuclear fuel rod for a PWR such as shown in FIGS. 1 and 2 but instead has a composite cladding 140 which comprises at least two layers of zirconium and/or zirconium alloy metals, including an outermost layer 141 and an inner layer 144. Outermost layer 141 has a decreasing oxygen concentration gradient depicted as a decreasing variation in stippling from outer wall 142 to an inner portion 141a, where despite a temperature gradient across the cladding wall, zirconium hydrides will preferentially precipitate in inner portion 141a of outermost layer 141 of cladding 140 and will be preferentially inhibited from precipitating near outer wall 142 of outermost layer 141 of cladding 140. In an alternative embodiment, composite cladding can include an innermost layer formed from a zirconium metal or alloy, or another metal or alloy. In a preferred embodiment, the innermost layer is a zirconium metal or alloy, and the oxygen content in outermost layer 141 of cladding 140 decreases from an amount greater than about 1600 ppm at outer wall 142 to less than about 1200 ppm in the inner portion 141a of outer layer 141.

Figure 6:
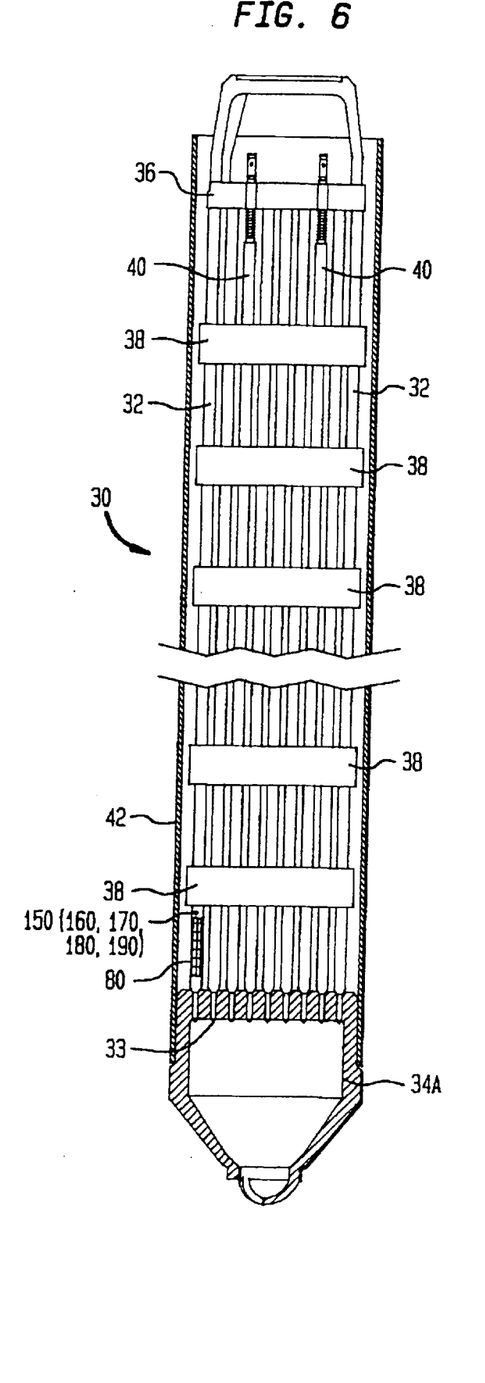
FIG. 6 is a side elevational view of a nuclear fuel assembly for a boiling water reactor, the assembly being foreshortened in height.

Referring to FIG. 6, a nuclear fuel assembly for a boiling water reactor (BWR) in the U.S. is generally shown at 30 having nuclear fuel rods 32 which are supported between a lower tie plate 34A and upper tie plate 36. Each fuel rod generally includes a metallic tubular fuel rod cladding 150 within which are nuclear fuel pellets 80 which are hermetically sealed within the tubular cladding by end sealing means such as end plugs. Lower tie plate 34A and upper tie plate 36 are connected structurally by tie rods 40 positioned within the array of fuel rods or by other means such as an inner water channel. Spacer grids 38 provide intermediate support of the fuel rods 32 over the length of the fuel assembly and maintain them in a spaced relationship while restraining them from lateral vibration. Outer channel 42 surrounds the fuel assembly and extends from the lower tie plate to the upper tie plate. An example of nuclear fuel assembly for use in boiling water reactors outside the U.S. and typically in Europe is generally shown at 30 in FIG. 7 and similarly has tie rods 40, spacer grids 38, outer channel 42, and fuel rods 32 each generally including a metallic tubular fuel cladding 150 within which are nuclear fuel pellets 80. The fuel rods 32 are supported between a lower tie plate 34B and upper tie plate 36.

Figure 7:
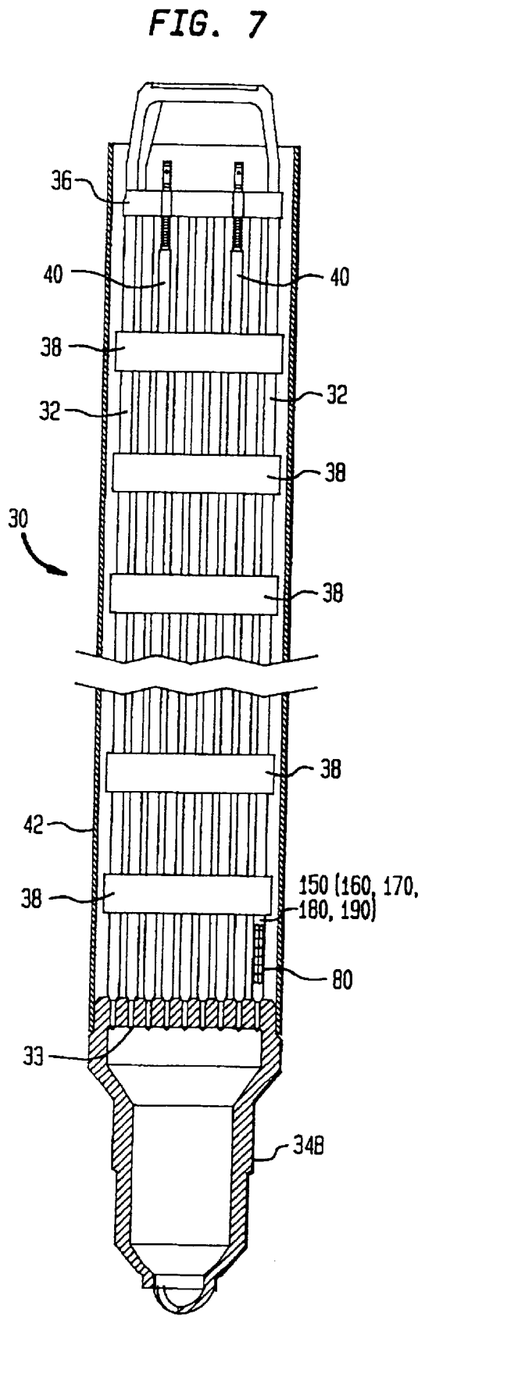
FIG. 7 is a side elevational view of another nuclear fuel assembly for a boiling water reactor, the assembly being foreshortened in height.
Figure 8:
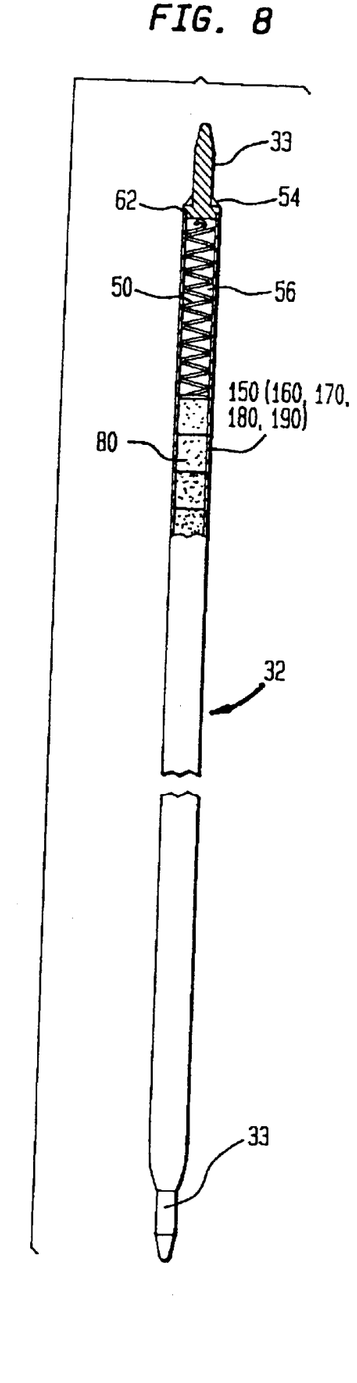
FIG. 8 shows a partial longitudinal sectional view of the nuclear fuel rod shown in FIGS. 6 and 7 with a portion of the cladding being cut away.

Referring to FIG. 8, nuclear fuel rod 32 shown in FIGS. 6 and 7 includes nuclear fuel shown as a plurality of fuel pellets 80 of fissionable and/or fertile material positioned within a metallic tubular fuel rod cladding 150. The metallic tubular fuel rod cladding is sealed at its ends by means of end plugs 54 which may include alignment pins 33 to facilitate the mounting of the fuel rod in the assembly. A void space or plenum 56 is provided at one end of the fuel rod to permit longitudinal expansion of the nuclear fuel and accumulation of gases released from the nuclear fuel. A helical spring member 58 is positioned within space 56 and is capable of maintaining the position of the fuel pellets during handling and transportation of the fuel rods. Cladding 150 is secured to end plugs 54 by means of circumferential welds 62.

Figure 9:
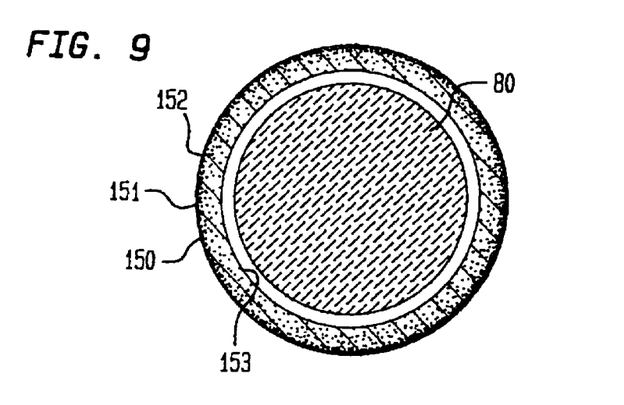
FIG. 9 is a schematic representation of a cross-sectional view of the nuclear fuel rod shown in FIG. 8.

Referring to FIG. 9 which is a schematic representation of a cross-sectional view of the nuclear fuel rod shown in FIG. 8, cladding 150 is a metallic tube having a single metal layer 151 of a zirconium alloy with a decreasing oxygen concentration gradient (depicted as a decreasing density in stippling) from outer wall 152 to inner wall 153. In a preferred embodiment, the oxygen concentration gradient from outer wall 152 to inner wall 153 decreases from at least about 1600 ppm to less than about 1200 ppm.

Figure 10A:
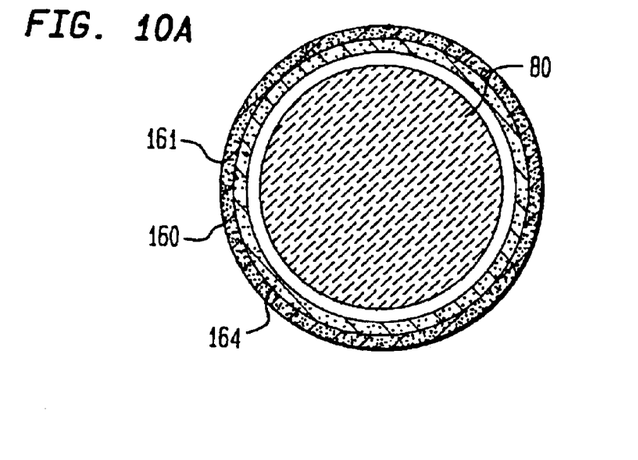
FIG. 10A is a schematic representation of a cross-sectional view of a nuclear fuel rod for use in a BWR and having a composite cladding comprising two layers.

Referring to FIG. 10A which is a schematic representation of a cross-sectional view of a nuclear fuel rod for a BWR such as shown in FIGS. 6–8 but instead has a composite cladding 160 comprising an outer layer 161 and an inner layer 164 each of which is composed of a zirconium and or zirconium alloy metal. Outer layer 161 has a higher oxygen content than inner layer 164 (which is depicted as different stippling) so that hydrides will preferentially precipitate in the inner layer 164 and be inhibited from precipitating in outer layer 161. In a preferred embodiment, outer layer 161 has an oxygen content greater than about 1600 ppm, and inner layer 164 has an oxygen content less than about 1200 ppm.

Figure 10B:
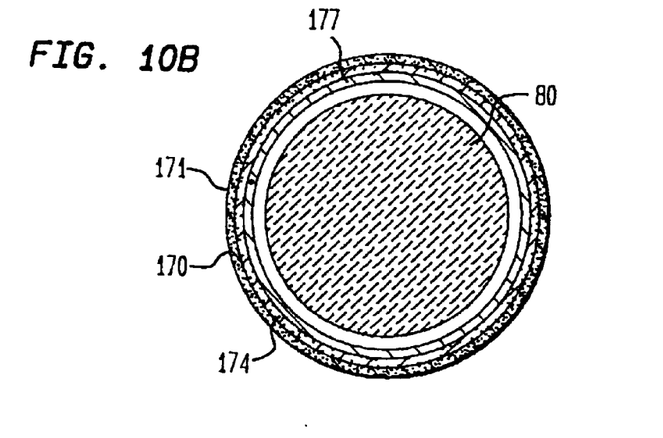
FIG. 10B is a schematic representation of a cross-sectional view of a nuclear fuel rod for use in a BWR and having a composite cladding comprising three layers.

Referring to FIG. 10B which is a schematic representation of a cross-sectional view of another nuclear fuel rod for a BWR such as shown in FIGS. 6–8 but instead has a composite cladding 170 comprising an outer layer 171, an inner layer 174 and an innermost layer 177. Outer layer 171 and inner layer 174 are composed of a zirconium and or zirconium alloy metal. Outer layer 171 has a higher oxygen content than inner layer 174 (which is depicted as different stippling) so that hydrides will preferentially precipitate in the inner layer 174 and be inhibited from precipitating in outer layer 171. Innermost layer 177 can be zirconium or a zirconium alloy, or another metal. In a preferred embodiment, outer layer 171 has an oxygen content greater than about 1600 ppm, and inner layer 174 has an oxygen content less than about 1200 ppm.

Figure 10C:
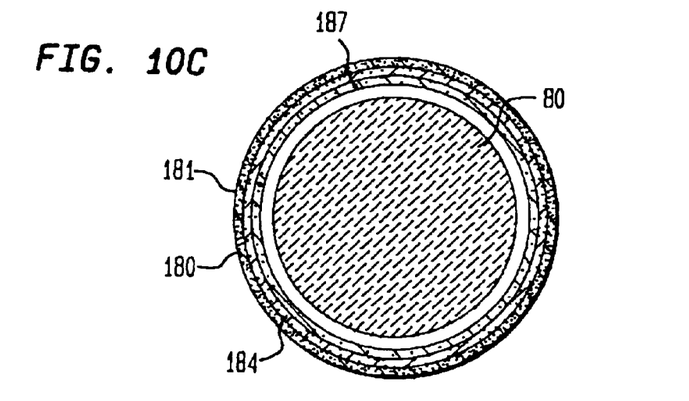
FIG. 10C is a schematic representation of a cross-sectional view of another nuclear fuel rod for use in a BWR and having a composite cladding comprising three layers.

Referring to FIG. 10C which is a schematic representation of a cross-sectional view of another nuclear fuel rod for a BWR such as shown in FIGS. 6–8 but instead has a composite cladding 180 comprising an outer layer 181, an inner layer 184, and an innermost layer 187 each of which is composed of a zirconium and or zirconium alloy metal. Outer layer 181 has a higher oxygen content than inner layer 184 (which is depicted as different stippling) so that hydrides will preferentially precipitate in the inner layer 184 and be inhibited from precipitating in outer layer 181. In a preferred embodiment, outer layer 181 has an oxygen content greater than about 1600 ppm, and inner layer 184 has an oxygen content less than about 1200 ppm. In another preferred embodiment, innermost layer 187 has an oxygen concentration which is at least that of inner layer 184 but less than or equal to outer layer 181.

Figure 11:
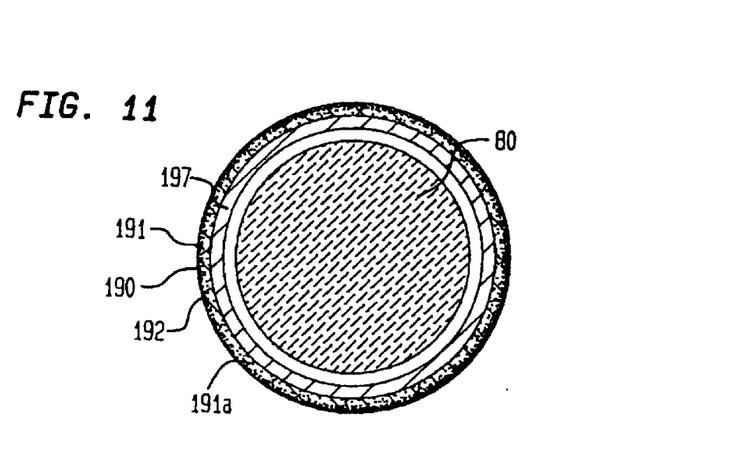
FIG. 11 is a schematic representation of a cross-sectional view of another nuclear fuel rod for use in a BWR and having a composite cladding comprising at least two layers.

Referring to FIG. 11 which is a schematic representation of a cross-sectional view of another nuclear fuel rod for a BWR such as shown in FIGS. 6–8 but instead has a composite cladding 190 which comprises at least two layers of zirconium and/or zirconium alloy metals, including an outermost layer 191 and an innermost layer 197. Outermost layer 191 has a decreasing oxygen concentration gradient depicted as a decreasing variation in stippling from outer wall 192 to an inner portion 191a where despite a temperature gradient across the cladding wall, zirconium hydrides will preferentially precipitate in inner portion 191a of outermost layer 191 and will be preferentially inhibited from precipitating near outer wall 192 of outermost layer 191. Although innermost layer 197 can be zirconium metal or alloy, or another metal or alloy, in a preferred embodiment, innermost layer 197 is a zirconium metal or alloy, and the oxygen content in outermost layer 191 of cladding 190 decreases from an amount greater than about 1600 ppm at the outer wall 192 to less than about 1200 ppm in the inner portion 191.

While the present invention has been particularly shown and described with reference to preferred embodiments thereof, it will be understood by those skilled in the art that various changes in form and details may be made therein without departing from the spirit and scope of the invention.

I claim:

1. A corrosion resistant nuclear fuel element for a water cooled and or moderated nuclear reactor comprising:

an elongated hollow metallic tubular cladding for containing a nuclear fuel, the tubular cladding comprising an outer tubular layer having an outer wall and an inner wall and an inner portion disposed between the outer wall and the inner wall, the outer tubular layer formed from metal selected from the group consisting of zirconium and a zirconium alloy having integrally incorporated a predetermined concentration of oxygen, said predetermined concentration of oxygen being a decreasing oxygen concentration gradient from the outer wall extending into the inner portion, so that when subject to corrosion zirconium hydrides preferentially precipitate in the inner portion and are inhibited from forming on the outer wall;

a body of nuclear fuel material disposed in the tubular cladding; and sealing means at both ends of the tubular cladding.

2. The corrosion resistant nuclear fuel element as in claim 1 wherein the decreasing oxygen concentration gradient from the outer wall extending into the inner portion decreases from at least about 1600 ppm to less than about 1200 ppm.

3. The corrosion resistant nuclear fuel element as in claim 1 wherein the tubular cladding further includes an inner layer bonded to the inner wall of the outer tubular layer.

4. The corrosion resistant nuclear fuel element as in claim 3 wherein the inner layer is formed from a metal selected from the group consisting of zirconium, a zirconium alloy and stainless steel.

5. The corrosion resistant nuclear fuel element as in claim 1 for use in a boiling water reactor.

6. The corrosion resistant nuclear fuel element as in claim 3 for use in a boiling water reactor.

7. The corrosion resistant nuclear fuel element as in claim 1 for use in a pressurized water reactor.

8. The corrosion resistant nuclear fuel element as in claim 3 for use in a pressurized water reactor.

9. The corrosion resistant nuclear fuel element as in claim 1 for use in a water moderated reactor.

10. The corrosion resistant nuclear fuel element as in claim 3 for use in a water moderated reactor.

11. The corrosion resistant nuclear fuel element as in claim 1 wherein the outer tubular layer is formed from Zircaloy 2.

12. The corrosion resistant nuclear fuel element as in claim 2 wherein the outer tubular layer is formed from Zircaloy 2.

13. The corrosion resistant nuclear fuel element as in claim 1 wherein the outer tubular layer is formed from Zircaloy 4.

14. The corrosion resistant nuclear fuel element as in claim 2 wherein the outer tubular layer is formed from Zircaloy 4.

15. A corrosion resistant nuclear fuel element for a water cooled and or moderated nuclear reactor comprising:

an elongated hollow metallic tubular cladding for containing a nuclear fuel, the tubular cladding comprising:
an outer tubular layer having an outer wall and an inner wall and an inner portion disposed between the outer wall and the inner wall, the outer tubular layer formed from a metal selected from the group consisting of zirconium and a zirconium alloy, the outer tubular layer having integrally incorporated a first predetermined concentration of oxygen at least about 1600 ppm;
an inner tubular layer bonded to the inner wall of the outer tubular layer and formed from a metal selected from the group consisting of zirconium and a zirconium alloy, the inner tubular layer having integrally incorporated a second predetermined concentration of oxygen, said second predetermined concentration of oxygen being less than said first predetermined concentration of oxygen so that when subject to corrosion, zirconium hydrides preferentially precipitate in the inner tubular layer and are inhibited from forming in the outer layer;
an innermost layer bonded to an inner wall of the inner tubular layer and formed from a metal selected from the group consisting of zirconium and a zirconium alloy, the innermost layer having integrally incorporated a third predetermined concentration of oxygen at least about 1600 ppm;
a body of nuclear fuel material disposed in the tubular cladding; and
sealing means at both ends of the tubular cladding for hermetically sealing the metallic tubular cladding.

16. The corrosion resistant nuclear fuel element as in claim 15 wherein said second predetermined concentration of oxygen is less than about 1200 ppm.

17. A corrosion resistant cladding tube for nuclear fuel for a water cooled and or moderated nuclear reactor comprising:

an elongated hollow metallic tubular cladding for containing a nuclear fuel, the tubular cladding comprising an outer tubular layer having an outer wall and an inner wall and an inner portion disposed between the outer wall and the inner wall, the outer tubular layer formed from metal selected from the group of zirconium and a zirconium alloy having integrally incorporated a predetermined concentration of oxygen, said predetermined concentration of oxygen being a decreasing oxygen concentration gradient from the outer wall extending into the inner portion, so that when subject to corrosion zirconium hydrides preferentially precipitate in the inner portion and are inhibited from forming on the outer wall.

18. The corrosion resistant cladding tube as in claim 17 wherein the decreasing oxygen concentration gradient from the outer wall to the inner wall decreases from at least about 1600 ppm to less than about 1200 ppm.

19. The corrosion resistant cladding tube as in claim 17 wherein the tubular cladding further includes an inner layer bonded to the inner wall of the outer layer.

20. The corrosion resistant cladding tube as in claim 19 wherein the inner layer is a metal selected from the group consisting of zirconium, a zirconium alloy and stainless steel.

21. A corrosion resistant nuclear fuel assembly for a pressurized water reactor comprising;

a) a lower tie plate;

b) a guide tube having an upper end and a lower end, the lower end connected to the lower tie plate;

c) spacer grids spaced along the guide tube;

d) an upper tie plate which is attached to the upper end of the guide tube;

e) a plurality of nuclear fuel rods which are spaced radially and supported along the guide tube by the spacer grids, at least one of the plurality of nuclear fuel rods comprising a metallic tubular fuel rod cladding containing nuclear fuel pellets therein, and having end sealing means thereon to hermetically seal the nuclear fuel pellets within the metallic tubular fuel rod cladding, wherein at least one of the nuclear fuel rods is comprised of:
an elongated hollow metallic tubular cladding for containing a nuclear fuel, the tubular cladding comprising an outer tubular layer having an outer wall and an inner wall and an inner portion disposed between the outer wall and the inner wall, the outer tubular layer formed from metal selected from the group of zirconium and a zirconium alloy having integrally incorporated a predetermined concentration of oxygen, said predetermined concentration of oxygen being a decreasing oxygen concentration gradient from the outer wall extending into the inner portion, so that when subject to corrosion zirconium hydrides preferentially precipitate in the inner portion and are inhibited from forming on the outer wall;
a body of nuclear fuel material disposed in the tubular cladding; and
sealing means at both ends of the tubular cladding.

22. A corrosion resistant cladding tube for nuclear fuel for a water cooled and or moderated nuclear reactor comprising:

an elongated hollow metallic tubular cladding for containing a nuclear fuel, the tubular cladding comprising an outer wall and an inner wall and an inner portion disposed between the outer wall and the inner wall, the inner portion at least formed from a metal selected from the group of zirconium and a zirconium alloy having integrally incorporated a first predetermined concentration of oxygen, said predetermined concentration of oxygen being a decreasing oxygen concentration gradient from the outer wall extending into the inner portion, so that when subject to corrosion zirconium hydrides preferentially precipitate in the inner portion and are inhibited from forming on the outer wall.

23. The corrosion resistant cladding tube as in claim 22 wherein the inner portion includes an outer tubular layer and an inner tubular layer and wherein the outer tubular layer has a first predetermined oxygen concentration and the inner tubular layer has a second predetermined oxygen concentration, said first predetermined oxygen concentration and said second predetermined oxygen concentration forming said decreasing oxygen concentration gradient from the outer wall to the inner wall.

24. The corrosion resistant cladding tube as in claim 22 wherein said inner portion includes a single layer having a decreasing oxygen concentration gradient that provides the decreasing oxygen concentration gradient from the outer wall to the inner wall.

* * * * *